Feb. 15, 1966 V. C. OXLEY ETAL 3,235,661

COMMUNICATIONS AND DATA PROCESSING EQUIPMENT

Filed July 11, 1962

3 Sheets-Sheet 1

INVENTORS
VINCENT C. OXLEY
WILLIAM E. DE LISLE

BY F. I. Sullivan

ATTORNEY

INVENTORS
VINCENT C. OXLEY
WILLIAM E. DE LISLE
BY
Fd Sullivan
ATTORNEY

INVENTORS
VINCENT C. OXLEY
WILLIAM E. DE LISLE
BY F. L. Sullivan
ATTORNEY 3,235,661

COMMUNICATIONS AND DATA PROCESSING EQUIPMENT

Vincent C. Oxley and William E. De Lisle, Buffalo, N.Y., assignors to Sylvania Electric Products Inc., a corporation of Delaware Filed July 11, 1962, Ser. No. 209,084
5 Claims. (Cl. 178—26)

This invention is concerned with communications systems and with data processing equipment useful therein, particularly reliable transmission of digital messages and serial-to-parallel converters useful for processing the data of such transmissions.

In pulse coded or digital communication and data processing systems having either radio or a closed circuit linkage, intelligence is transmitted and otherwise processed in the form of electric or electromagnetic impulses. For example, messages may be comprised by the presence or absence, or by variations in the amplitude, tone, frequency, etc. of synchronous signals representing the ONE's and ZERO's of a binary code. The reliability of these digital communication systems is affected by the extent to which noise and other interferences distort the impulse signals during transmission so that ONE's are mistaken for ZERO's and vice versa or to which phenomena such as momentary fading of radio frequency carriers at times delete digits or groups of digits from the attempted communication. Their effiiciency may be rated by the amount of information they can transmit over a given channel within a given unit of time, and to optimize the concentration of information within given units of time and transmission facilities, various schemes have been employed to multiplex data within a given information channel or amongst a plurality of channels.

A typical example of such multiplexing is the use of a single separate tone or frequency from a possible total of thirty-two to indicate each one of the various five digit combinations which comprise the thirty-two alpha-numeric characters of the standard Baudot code used in teletypewriter communication systems. Various other and more sophisticated multiplexing schemes have been employed with considerable success. They all, however, feature the transmission of a single impulse to represent a plurality of digits and are subject to the practical limitation that the loss of any such single impulse results in the loss of a number of digits. Moreover, the more efficient the multiplexing scheme, in that it concentrates more data within a single transmitted impulse, the more serious the consequences may be when that single impulse is lost.

In an attempt to overcome these difficulties and otherwise improve the reliability of digital data transmission systems, various error detecting and correcting systems have been employed of which a typical example is disclosed in copending U.S. patent application Serial No. 842,549, filed on September 24, 1959, now Patent No. 3,093,707, and also assigned to Sylvania Electric Products Inc. In this particular error correcting technique, the five digits of a standard teletypewriter character are expanded by a specialized encoding circuit into a fifteen bit word before it is transmitted. Then, the fifteen bit transmission is analyzed at the receiver by a series of algebraic equations embodied in logic circuits which are related to the encoding circuits of the transmitter in such a manner that every digit of the received word bears a known relationship to every other bit in the word; and, consequently, up to a certain number of incorrectly received digits may be corrected and missing digits may be restored.

It is apparent, however, that this expanded word length has an inherent redundancy which requires extra time and extra equipment for its processing. Moreover, in present state-of-the-art multiplexing schemes wherein the same combination of digits, and consequently the same multiplexed impulse, is always employed to represent any given character or other message unit, a malfunction or difficulty which causes that impulse to be lost may be continuing in nature and therefore will cause this particular character or group of characters to be lost consistently over an extended period of transmission.

Accordingly, a primary object of the present invention is to provide an improved technique for the transmission of digital data. Other objects are to provide a more reliable method for multiplexing digital messages, an improved data processing subsystem for such transmission systems and an improved serial-to-parallel converter for use in processing such messages.

These and related objects are accomplished in one embodiment of the invention by processing a serial stream of binary digits, wherein groups of sequential bits represent the component digital words (e.g. alpha-numeric characters) of a message, through a special serial-to-parallel converter before they are encoded for multiplexed transmission. The parallel output of this converter is comprised of spaced apart rather than adjacent digits of the original message. Thus, when this output is multiplexed into a single transmission, any given single impulse represents a plurality of digits which may be so sufficiently spaced apart that they are not components of the same digital word. Consequently, the loss of one or even a series of adjacent impulses will not eliminate all or even a majority of the digits of any particular word in the transmission. It will be appreciated that this enables the digit correcting capability of the redundant data schemes to be used much more effectively. Moreover, since the different characters or digits words of a message are employed in constantly varying combinations with other characters, a consistent failure of a given frequency, tone, etc. impulse will not result in loss of message content because of the diversity accomplished by multiplexing corresponding digits of different words instead of sequences of digits within the same word.

Other objects, embodiments, features, and modifications of the invention will be apparent from the following description in which a digital transmission system utilizing the invention will be described by reference to the accompanying drawings, wherein.

Figure 1:
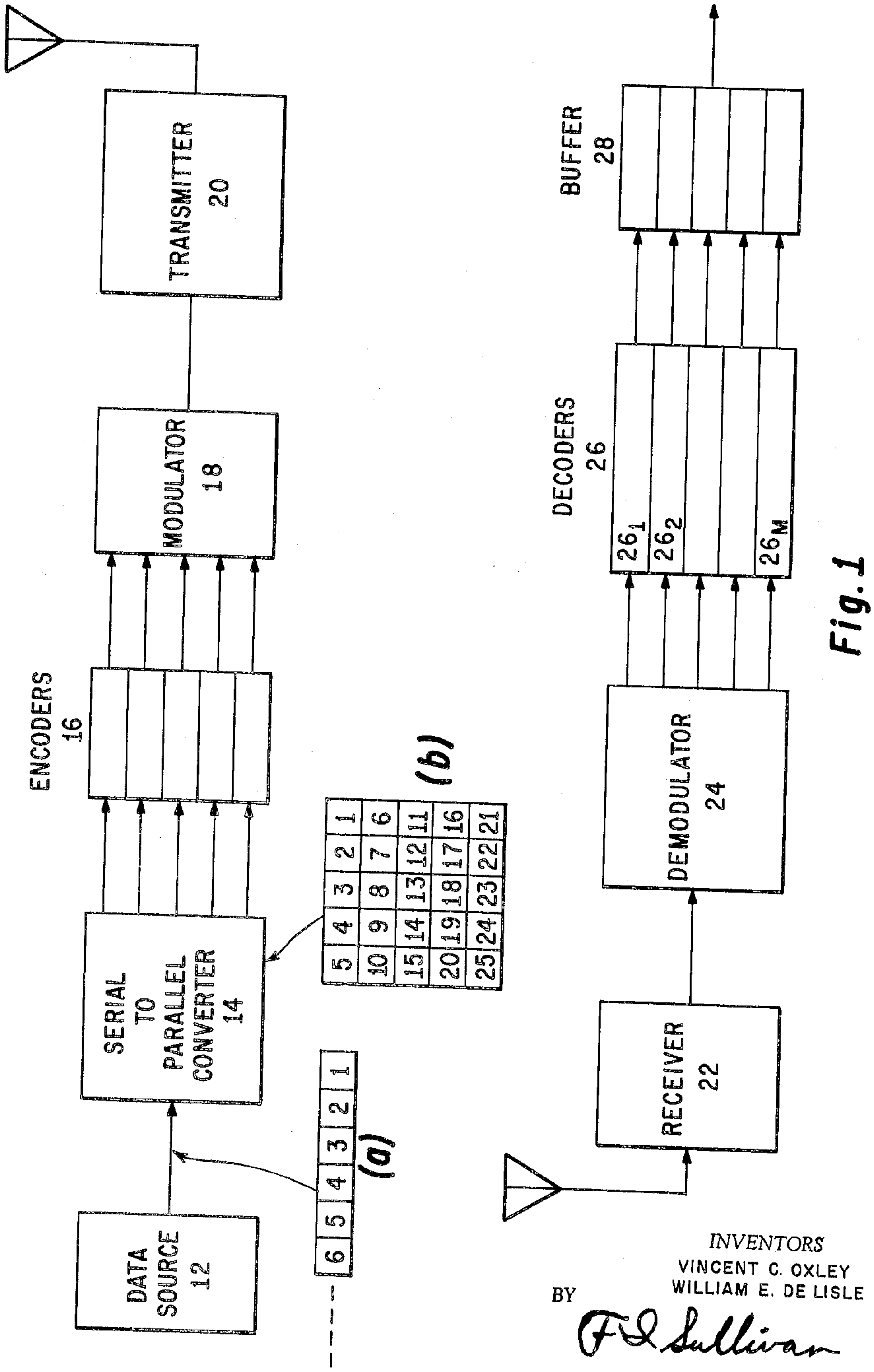
FIG. 1 is a block diagram of a data transmission system.

The radio communication system shown in FIG. 1 comprises a data source 12, a serial-to-parallel converter 14, encoders 16, a modulator 18, a transmitter 20, a receiver 22, a demodulator 24, decoders 26 and a buffer 28. The serial-to-parallel converter 14 represents the principal feature of the invention. Consequently, its construction and operation will be explained in full detail. The other components of the system, however, are well known in various modifications to those skilled in the art of radio communication and electronic data processing, or are described in the previously mentioned patent application. Consequently, there is no need for burdening the present description with details of their overall system organization, structure, and operation.

The function of the serial-to-parallel converter 14 (shown in detail in the block diagram of FIG. 2) is to arrange the serial information shown in the serial format *a* of FIG. 1 to the parallel format *b*. This is accomplished, in the system illustrated, by processing the serial data from the data source 12 through a sampling gate 30 to a buffer store 32 which is comprised of a number M of storage lines each having a capacity for an N bit word. In the illustrative system under discussion, it will be assumed that the N bit words are actually standard five bit representations of teletypewriter characters in Baudot code and that M is also equal to five. This provides a 5 x 5 buffer storage matrix. The serial information train from sample gate 30 is loaded into this buffer 32 in accordance with a sequence of control signals (FIG. 3) originating from a system clock 34 and processed through a ring counter 36, an N counter 38, and a signal burst generator 40. After the buffer storage matrix 32 has been loaded, its signal content is transferred to an output storage matrix 42; and, from thence, it is processed through a system of encoders 16 to the output modulator and multiplexer 18 of the transmitter 20.

Figure 2:
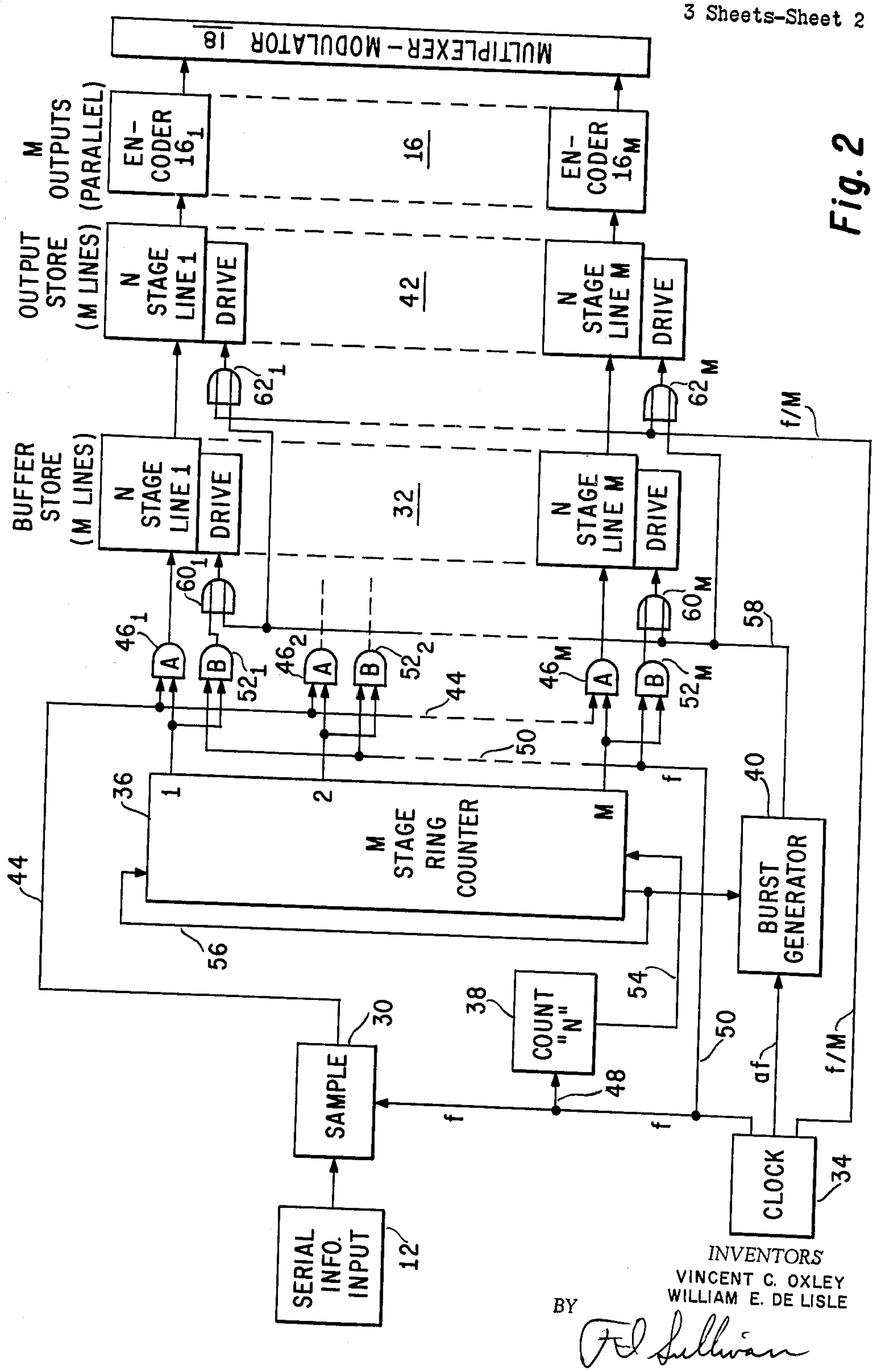
FIG. 2 is a more detailed block diagram of a serial-to-parallel converter useful in the transmitter of FIG. 1; and, FIG. 3 is a timing diagram of signals employed to process digital data through the converter of FIG. 2.
Figure 3:
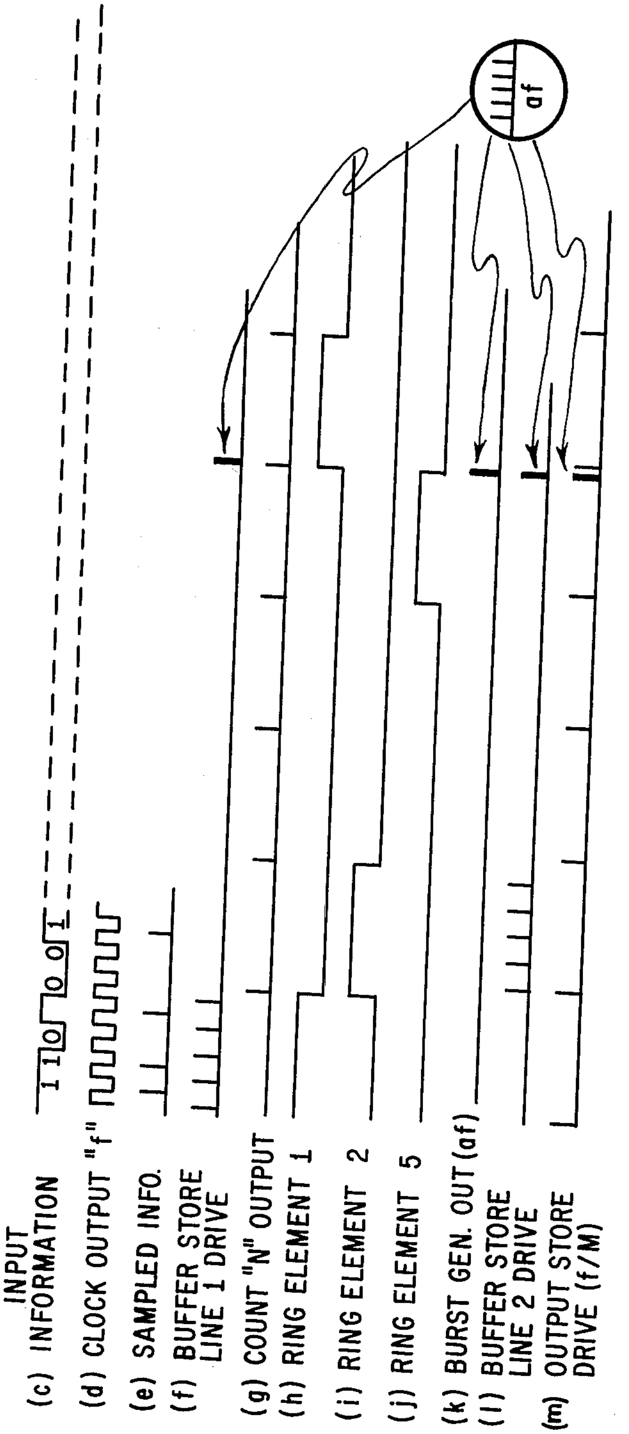

To perform these equations, the apparatus of FIG. 2, which consists of merely a unique combination of well known pulse generators, counters, logic gates, buffer storage units, etc., is arranged to produce the signal waveforms and control signals of FIG. 3. Since these units are well known in the art, there is no need here for detailed description of their structure. Suitable circuits will be readily apparent to those skilled in the art and typical examples of the structures required may be found in standard reference works such as Arithmetic Operations in Digital Computers, R. K. Richards (Van Nostrand), and Pulse and Digital Circuits, Millman and Taub (McGraw-Hill).

The sample gate 30 is a conventional combination of logic circuits arranged to produce the output signal train *e* of FIG. 3 consisting of the presence or absence of a pulse during each clock interval at frequency "*f*" (waveform *d*) depending upon whether the incidence of this clock pulse at the gate coincided with a ONE or a ZERO signal from the message input (waveform *c*).

The individual storage lines of the buffer store 32 and output store 42 are comprised of standard N stage pulse shifting registers. In the equipment under description, there are five stages in each of these registers and five lines, i.e. registers, in each store.

The clock 34 may be a crystal controlled oscillator or any conventional digital clock which generates three sets of synchronous signals:

*f* c.p.s.—which is equal to and synchronous with the serial information input rate (see waveform *d* in FIG. 3);

*f/M* c.p.s.—the rate at which M bit groups are read out of the system (waveform *m* in FIG. 3);

*af* c.p.s.—the burst transfer rate, where $a>N$ so that the entire content of an N digit storage line can be processed within a single bit interval to avoid interference between read-out and read-in functions in the buffer store 32 and the output store 42 (see waveforms *f*, *k*, *l*, and *m* in FIG. 3).

The M stage ring counter 36 may be a standard pulse shifting register with end around connection between its output and input stages. Alternatively, other ring counting devices such as glow transfer tubes may be employed. In the system shown in FIG. 2, this counter has five stages and an output signal level is available at each stage when it is in energized condition. Waveforms *h*, *i*, and *j* of FIG. 2 demonstrate the output of the first, second, and fifth stages, respectively, of this counter.

N counter 38 is a conventional counter circuit arranged, in this case, to produce an output pulse *g* for each five input pulses *f*.

Burst generator 40 may be comprised of a gate arranged to transmit a count of N, i.e. 5, pulses from clock 34 at frequency *af* each time it is energized by an output signal from the M stage ring counter 36.

The gates 46 and 52 are conventional AND gates, and gates 60 and 62 are conventional OR gates. The encoders 16 take the five digit teletypewriter code words from the output store 42 and expand them into fifteen digit error correcting code words. Specific details of structure and operation for these encoders are found in the copending patent application referenced above.

*Operation*

The operation of the system will now be explained in more detail with reference to the timing diagram of FIG. 3 wherein, as explained previously:

*c* represents the waveform for a series of binary signals in which a ONE is indicated by a relatively positive pulse and a ZERO by a relatively negative pulse, with a non-return-to-ZERO technique being employed for indicating adjacent ONE's;

*d* represents the output pulses from clock 34 at frequency "*f*";

*e* represents the output from the sampling gate 30 in response to the digital input of the data represented by waveform *c*;

$f_1$ represents drive pulses derived from the clock output at frequency "*f*";

*g* represents the output of the N counter 38;

*h–j* represents the signal level outputs from the ring counter 36 during its first, second, and fifth timing intervals;

*k* represents the signal output from the burst generator 40;

*l* represents the drive signals for the buffer storage matrix 32; and,

*m* represents the drive signals for the output matrix 42.

Assuming a starting condition with all storage elements cleared, the M stage ring counter 36 in phase 1, and the count-N circuit 38 at a count of 0, the system operates in the following manner to process a message from data source 12.

A clock output pulse *d* (see FIG. 3), at rate *f*, samples the binary information input to the sampling circuit 30 at approximately the center of the first bit. The effect of this operation is demonstrated by a comparison of the signal waveforms *c*, *d*, and *e* in FIG. 3 where the clock pulses *d* produce a signal in sequence *e* when the input *c* is at the ONE level and no signal when it is at the ZERO level. The output from the sampler is transmitted, over conductor 44, to the AND gates $46_1$–$46_M$ which comprise the inputs to the M storage lines in the buffer store 32. Because the ring counter 36 has only its first stage energized, only AND gate $46_1$ responds to the input signal on conductor 44. Consequently, the data being sampled is written into only the first storage line of the buffer store 32.

The pulse used to operate the sample gate 30 also transmits a signal pulse, over conductor 48, to register a count of 1 in the N counter 38. At a time toward the end of the first bit period, i.e. during the negative portion of the signal pulse *d*, a pulse (*f* in FIG. 3) is applied via conductor 50 to the AND gates $52_1$–$52_M$; and, since only the gate $52_1$ is energized by the ring counter 36, only the first line of buffer store 32 is driven by this pulse. The effect of this drive is to shift the data content of the line one place. This moves the previous data content of each stage to the next succeeding stage and clears stage one.

The sampling and driving sequence continues until the counter 38 achieves a count of N which in the illustrative embodiment under description is equal to five. At this time, the first line of the buffer store 32 is full and contains N (i.e. 5) bits of information. Reaching the count of N causes the counter 38 to emit a control signal, via conductor 54 to the ring counter 36 causing it to shift from its phase 1 condition to its phase 2 condition as demonstrated by the waveforms *h* and *i*, respectively, in FIG. 3. The second line of the buffer store 32 is now loaded in the same manner as the first, and the succeeding lines of the store are similarly loaded down through the final line M.

The $(M+1)$ pulse from the counter 38 results in a re-energization of the first stage of counter 36 via feedback connection 56. At the same time, burst generator 40 is energized to produce, via conductor 58, the burst pulses ($af$) shown as waveform $k$ in FIG. 3. There are N pulses in this burst which is applied to all of the lines in the buffer store 32 via OR gates $60_1$–$60_M$ and to all of the lines in the output store 42 via OR gates $62_1$–$62_M$. In addition, a sequence of $f/M$ drive pulses ($m$ in FIG. 3) are applied, via OR gates $62_1$–$62_M$ to the output store 42 during the loading of the matrix 32. Thus, the contents of the output store 42 is shifted out of the output store 42 and transferred to the encoders 16 before a new N x M bit load is processed into it. As each $f/M$ pulse is applied to the system, a single digit from each one of the M words in the output store 42 is processed in parallel to the encoders 16 where they are accumulated; and, after redundant digits have been added, e.g. in the manner explained in the patent application referenced above for converting five-digit words into error correctable fifteen-digit words, they are processed into the modulator 18 which, in the system suggested for illustrative purposes, converts five digits, one taken from each of five different words, into a single frequency or tone for transmission.

Referring to the $a$ and $b$ formats of FIG. 1, the serial-to-parallel converter which has been described accepts the serial digits 1, 2–27, etc. of format $a$ and converts them to the M x N format $b$ wherein the first parallel M bit output consists of digits 1, 6, 11, 16, and 21 as distinguished from adjacent digits in the original numerical sequence. Thus, bit errors resulting from a loss of or mistaken reception of a given tone or frequency signal are distributed throughout M encoded words and the error detecting or correcting features of the encoder are rendered more effective. Also, the multiplexing of digits from different words instead of within the same word prevents any particular combination of digits, which might be consistently lost because of an equipment malfunction or transmission interference related to a given frequency, from creating an uncorrectable number of errors in a single encoded word.

The received tones are detected at the receiver 22, and each tone is converted back to a 5-bit group by the demodulator 24. Each group is then loaded in parallel and shifted into five decoders ($26_1$–$26_M$) such that the decoders, when full, will contain the 15-bit parallel words; i.e. decoder $26_1$ will contain bits 1, 2, 3, 4, and 5, and the redundant bits associated with this word; decoder $26_2$ will contain bits 6, 7, 8, 9, and 10, and the redundant bits associated with the word, etc. Decoding is now performed at high speed, according to the method described in the previously referenced patent application, and the outputs of the decoders are loaded into the buffer store 28, in the same order as represented by format $b$ in FIG. 1. The information is then read out of the buffer store 28 serially in the same order as represented by format $a$ in FIG. 1.

Although the invention has been described with reference to a particular illustrative embodiment, it is not limited to the specifics of the foregoing description and drawings but embraces the full scope of the following claims.

What is claimed is:

1. For the processing of digital data signals: a source of digital data in serial format; a plurality of pulse shifting registers; means for processing different serial groups of said serial signals through corresponding different ones of said registers; and, means for deriving from said different serial groups a series of parallel groups of signals, each of said parallel groups comprising a single corresponding digit from each one of a plurality of said serial groups.

2. A digital data transmission system comprising: a source of digital data in serial format; means for converting said serial format to a parallel format; means for multiplexing groups of digits in said parallel format into transmission impulses; means for receiving and detecting said impulses; means for converting said detected impulses into groups of digit signals in parallel format; and, means for converting said parallel format into signals representative of said original serial format.

3. A digital data transmission system comprising: a source of digital data in serial format; means for converting said serial format into a parallel format comprised of a plurality of digital words, corresponding digits of said words being non-adjacent digits of said serial format; means for converting groups of said corresponding digits into transmission impulses; means for converting said transmission impulses into digital data words in a parallel format; and, means for converting said last-mentioned parallel format into signals representative of said original serial format.

4. A digital data transmission system comprising: a source of digital data in serial format; means for converting said serial format into a parallel format comprised of a plurality of digital words, corresponding digits of said words being non-adjacent digits of said serial format; means for redundant encoding of each of said words into an expanded length; means for converting corresponding digits from groups of said expanded words to transmission impulses; means for demodulating said expanded words from said transmission impulses; means for converting said demodulated words from their expanded to their original content in parallel format; and, means for converting said last-mentioned parallel format into signals representative of said original serial format.

5. For the processing of digital data, a serial-to-parallel converter comprising: a source of data in serial format; a buffer store including a first plurality of pulse shifting storage registers; an output store including a second plurality of pulse shifting storage registers; a source of control signals; a counter connected to said source of control signals and arranged to produce one output pulse for every N input pulses received from said control signal source; a ring counter connected to the output of said N counter; said ring counter having M different output connections and being arranged to transfer an output signal level from one to another of said output connections each time a pulse is received from the N counter; means for connecting said source of data to different ones of said shifting registers in said buffer store when corresponding ones of said different output connections of said ring counter are energized; and, means for transferring data signals from the pulse shifting registers of said buffer store to corresponding pulse shifting registers of said output store.

References Cited by the Examiner

UNITED STATES PATENTS 3,079,597 2/1963 Wild ---------------- 340—347

NEIL C. READ, *Primary Examiner.*

LLOYD W. MASSEY, *Examiner.*